United States Patent [19]

Attwater et al.

[11] Patent Number: 5,778,344

[45] Date of Patent: Jul. 7, 1998

US005778344A

[54] DATABASE ACCESS USING DATA FIELD TRANSLATIONS TO FIND UNIQUE DATABASE ENTRIES

[75] Inventors: David J. Attwater; Paul A. Olsen; Seamur A. Bridgeman; Steven J. Whittaker, all of Ipswich, Great Britain

[73] Assignee: British Telecommunications public limited company, London, England

[21] Appl. No.: 659,526

[22] Filed: Jun. 5, 1996

[30] Foreign Application Priority Data

Jan. 31, 1996 [GB] United Kingdom ............... 9601925

[51] Int. Cl.$^6$ ........................................... G10L 9/00
[52] U.S. Cl. ............... 704/275; 704/10; 704/252; 704/255; 704/254; 707/1; 707/6
[58] Field of Search ................ 395/2.84, 2.61, 395/2.63, 2.64, 2.69, 601, 759; 379/88

[56] References Cited

U.S. PATENT DOCUMENTS

| | | | |
|---|---|---|---|
| 4,809,333 | 2/1989 | Taylor | 395/2.61 |
| 4,831,654 | 5/1989 | Dick | 395/2.69 |
| 5,027,406 | 6/1991 | Roberts et al. | 395/2.53 |
| 5,204,894 | 4/1993 | Darden | 379/88 |
| 5,251,129 | 10/1993 | Jacobs et al. | 395/759 |
| 5,329,608 | 7/1994 | Bocchieri et al. | 395/2.52 |
| 5,333,317 | 7/1994 | Dann | 395/605 |
| 5,454,062 | 9/1995 | La Rue | 395/2.63 |
| 5,623,578 | 4/1997 | Mikklineneni | 395/2.64 |
| 5,638,425 | 6/1997 | Meador, III et al. | 379/88 |

FOREIGN PATENT DOCUMENTS

| | | |
|---|---|---|
| 433964 | 6/1991 | European Pat. Off. |
| WO A9414270 | 6/1994 | WIPO |

OTHER PUBLICATIONS

Attwater et al, "Issues in Large–Vocabulary Interactive Speech Systems", BT Technology Journal, published Feb. 22, 1996, vol. 14, No. 1, Jan. 1966, Ipswich, Suffolk, GB, pp. 177–186, XP000579339.

*Primary Examiner*—David R. Hudspeth
*Assistant Examiner*—Vijay B. Chawan
*Attorney, Agent, or Firm*—Nixon & Vanderhye P.C.

[57] ABSTRACT

A database with entries having possibly indistinguishable tuples of fields in one or more related vocabulary is accessed using vocabulary translations of fields to identify unique tuples thereof.

10 Claims, 7 Drawing Sheets

DATABASE ACCESS USING DATA FIELD TRANSLATIONS TO FIND UNIQUE DATABASE ENTRIES

BACKGROUND OF THE INVENTION

1. Field of the Invention

The present invention relates to a database access particularly, though not exclusively, employing speech recognition input and synthesised speech output.

2. Related Art

Database access via voice recognition to produce synthesised voice output has been described by others (see, for example, U.S. Pat. Nos. 5,638,425 and 5,623,578). Speech recognition is also well known (see, for example, U.S. Pat. Nos. 5,454,062; 5,329,608; and 5,027,406). Text to speech synthesis is also known (e.g., see U.S. Pat. No. 4,831,654). Many of these prior works also involve database use and/or management—including attempts to automatically resolve look-up ambiguities (e.g., see U.S. Pat. Nos. 5,333,317 and 5,251,129. However, all such prior approaches continue to have deficiencies—especially with respect to resolution of ambiguities caused by slightly different vocabularies used for speech and/or other real world ambiguities and the stored database entries.

SUMMARY OF THE INVENTION

According to one aspect of the present invention there is provided a database access apparatus comprising:

(a) a database containing entries each comprising a plurality of fields which contain machine representations of items of information pertaining to the entry, the said representations forming a first vocabulary;

(b) announcement means responsive to machine representations falling within a second vocabulary of such representations to generate audio signals representing spoken announcements;

(c) input means operable to receive signals and to produce machine representations falling within a third vocabulary of such representations;

(d) translation means defining a relationship between the first vocabulary and the second vocabulary and between the first vocabulary and the third vocabulary; and (e) control means operable (i) to generate, in accordance with the defined relationship, for each representation produced by the input means, one or more representations according to the first vocabulary;

(ii) to identify database entries containing the generated representations;

(iii) to examine each representation or combination of representations which is contained in a selected field or combination of fields of the identified entries to identify unique one(s) of those representations or combinations, a unique representation or combination being one which, when translated using the translation means into representations of the second vocabulary, differs from every other such unique representation or combination when similarly translated; and (iv) to control the announcement means to generate an announcement including at least one word or combination of words which correspond(s) to one of the unique representations or combinations.

In another aspect the invention provides a method of speech recognition comprising (a) generating at least one announcement requiring a spoken response;

(b) recognising the response(s);

(c) identifying database entries containing fields matching the recognised responses;

(d) in the event that the number of such entries exceeds a predetermined limit, generating an announcement containing at least one word corresponding to a selected field of an identified entry for a positive or negative response;

(e) upon receipt of a positive response, identifying database entries which contain fields matching the recognised responses and whose selected fields match the said word; and (f) repeating steps (d) and (e) at least once.

BRIEF DESCRIPTION OF THE DRAWINGS

Some embodiments of the present invention will now be described, by way of example, with reference to the accompanying drawings.

DETAILED DESCRIPTION OF EXEMPLARY EMBODIMENTS

A voice interactive apparatus will be described, which generates questions to a user and recognises the user's responses in order to access the contents of the database. A database of names, addresses and telephone numbers, as might be used for an automated telephone directory enquiry system will be used as an example. Firstly, however, some basic concepts will be discussed which will be of value in understanding the operation of the apparatus.

The database will be supposed to contain a number of entries, with each entry containing a number of fields each containing an item of information about the entry; for example the forename, surname, location and telephone number of the person to whom the entry refers. A set of fields from one entry is here referred to as a tuple, viz. a combination of N fields (when N=1, 2 or 3 the terms single, duple and triple respectively are used). A complete entry is thus a tuple as also is a smaller set of fields extracted from one entry; thus a set of forename/surname pairs taken from the example database forms a set of extracted duples.

The items of information stored in the database fields may be in any convenient representation; generally this description will assume the use of a text representation such as, for the surname Jonson, character codes corresponding to the letters of the name, but with a stylised representation for some fields; for example one might, for geographical locations, identify several distinct places having the same name with different representations—e.g. Southend1, Southend2 and Southend3 for three place in England called Southend.

The words used in the dialogue between the apparatus and the user to represent field contents are conceptually distinct from the database representations and represent for each field a spoken vocabulary. If the database representations are text then there will be some overlap between them and the spoken vocabulary, but even then it may be desired to take account of the fact that the user might use, to describe an item of information, a different word from that actually contained in the database field; that is, some words may be regarded as synonyms.

Finally one needs also to note that more than one pronunciation may be associated with a word (homonyms), and conversely more than one word may have the same pronunciation (homophones).

Figure 1:
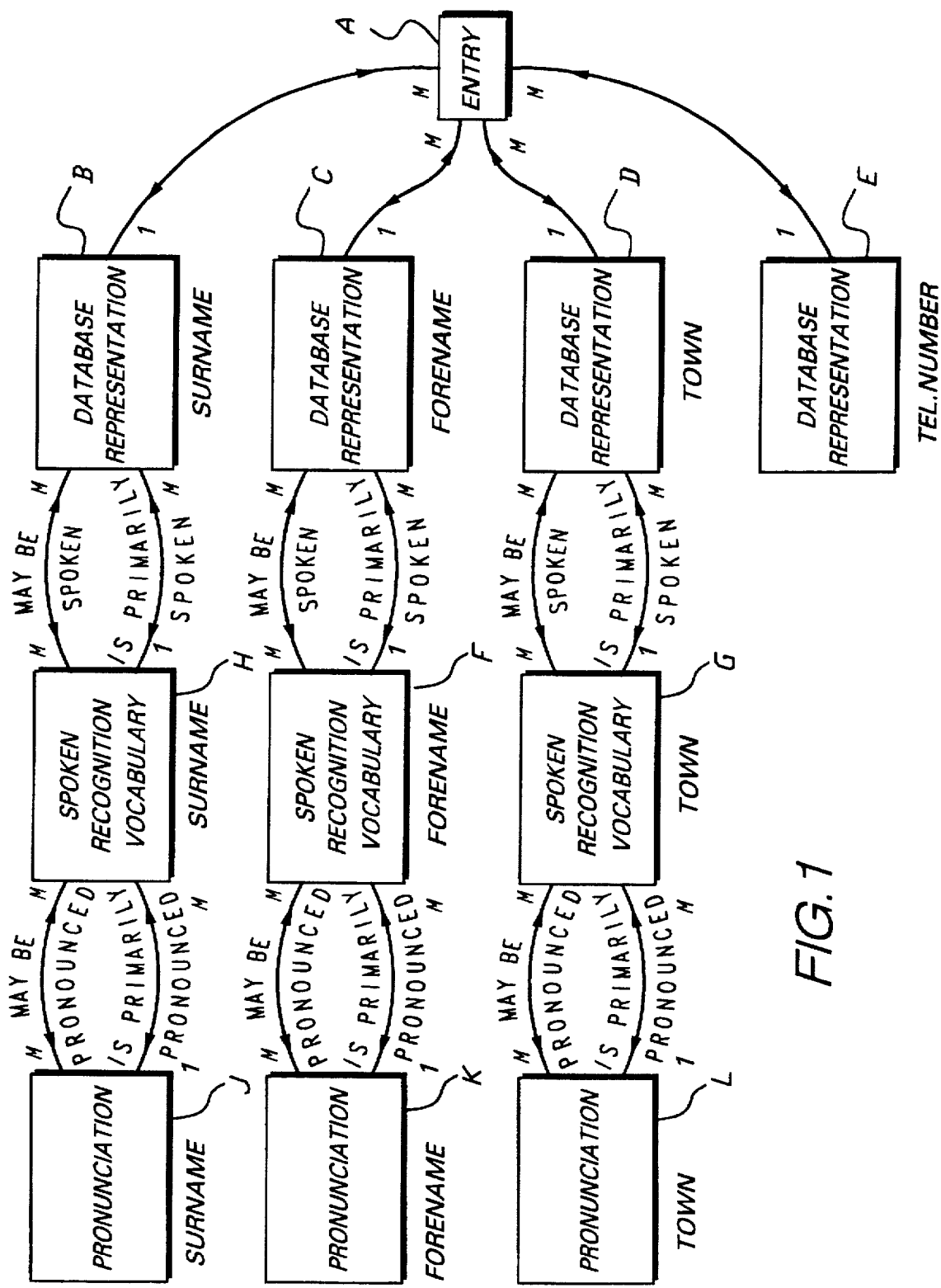
FIG. 1 is an Entity Relationship Diagram for an exemplary embodiment of this invention.

These concepts are illustrated in FIG. 1 which is an "Entity Relationship Diagram", where we see a need for translation between representations as one moves from left to right or right to left. Box A represents a set of database entries. Box B represents a set of unique surnames, which have a 1:many relationship with the entries—i.e. one surname may appear in many entries but one entry will contain only one surname. Boxes C, D and E correspond to sets of representations of forenames, towns and telephone numbers, where similar comments apply. Box F represents the spoken vocabulary corresponding to forenames i.e. the set of all words that are permitted by the apparatus to be used to describe this field. This can differ from the database vocabulary (or, even if it is the same, may not have a 1:1 correspondence with it) to take account of aliases such as synonyms, for example an abbreviated form of a forename such as Andy or Jim may be considered to have the same meaning as the full forms of Andrew and James. Two connecting paths are shown between boxes C and F, corresponding to a preferred form for the spoken vocabulary word and to alternative forms which "may possibly" be used.

Similarly, Box G represents the spoken vocabulary corresponding to town names. Here again the possibility of aliasing arise since often a large town may contain smaller places or districts within it. For example, Ipswich is a town in the county of Suffolk, England. Nearby is a small district called Kesgrave. A person living in Kesgrave might have his address recorded in the database either as Ipswich or as Kesgrave. Similarly an enquirer seeking the telephone number of such a person might give either name as the location. Thus Ipswich and Kesgrave may be regarded as synonymous for the purposes of database retrieval. Note however that this geographical aliasing is complex: Ipswich may be regarded as synonymous with another local village such as Foxhall, but Kesgrave and Foxhall are not synonymous because they are different places.

Box H represents, for completeness, a spoken vocabulary for surnames, though there is probably little scope for synonyms for this field.

Box J represents a pronunciation vocabulary for surnames, to take account of homophones and homonyms. For example the surname Smith is generally pronounced with a short "i" as in the English word "pith", whilst the name Smythe is pronounced with a long "i" as in "lithe". Smyth, on the other hand, may be pronounced either way. Other instances of varying pronunciation may arise, for example due to variations in regional accents. Again, "primary" and "may be" links are shown, for reasons to be explained later.

Boxes K and L represent pronunciation vocabularies for forenames and geographical names respectively.

Figure 2:
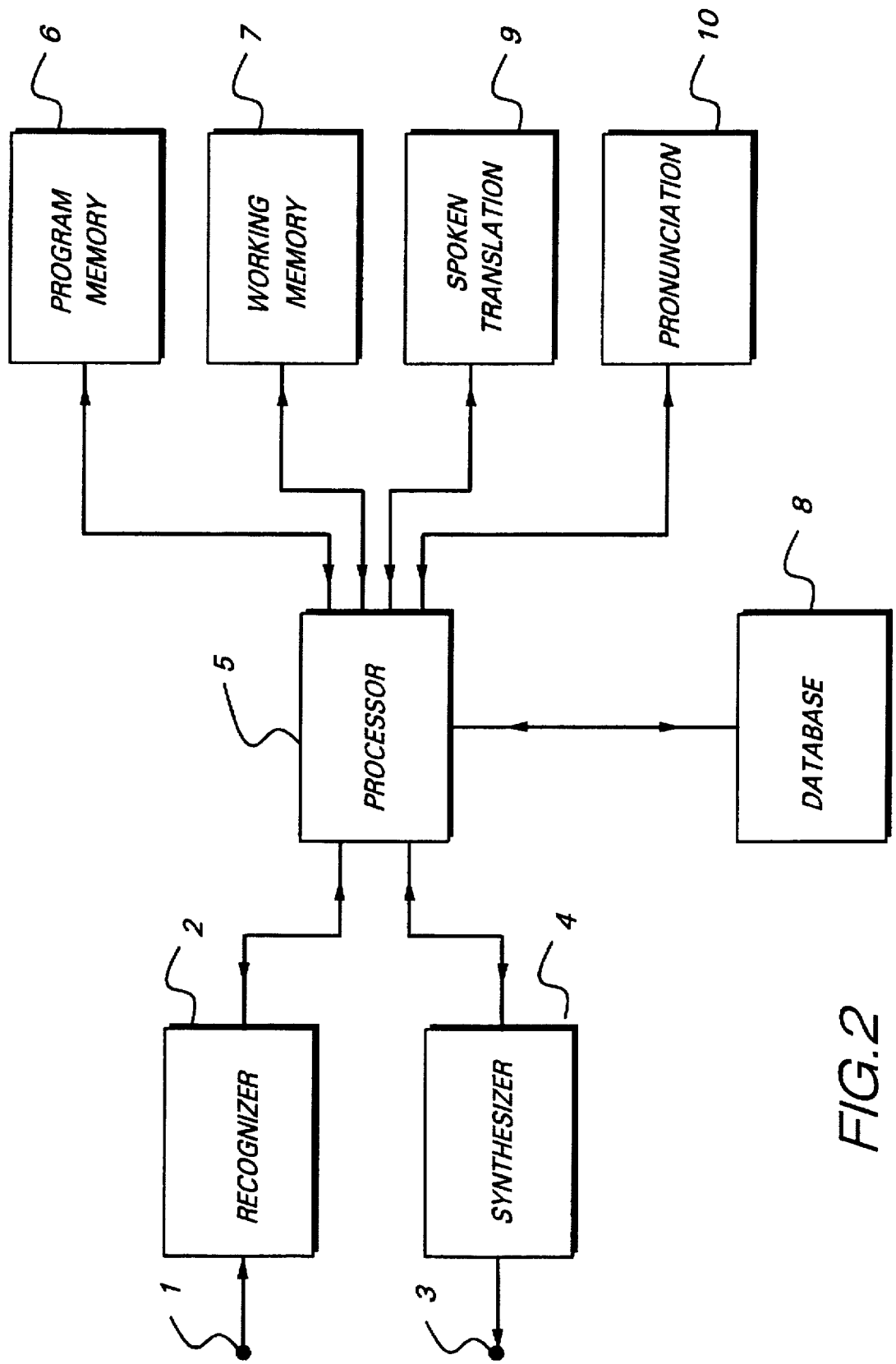
FIG. 2 is a block diagram of an exemplary apparatus for conducting a dialog in accordance with this invention.

FIG. 2 is a block diagram of an apparatus for conducting a dialogue. An audio signal input 1 is connected to a speech recogniser 2, whilst an audio signal output 3 is connected to a speech synthesiser 4. A control unit in the form of a stored-program controlled processor 5 controls the operation of the recogniser and synthesiser and also has access to a program memory 6, a working memory (RAM) 7, a database 8, a spoken vocabulary translation table 9 and a pronunciation table 10. The audio inputs and outputs are connected for two-way communication—perhaps via a telephone line—with a user.

The database 8 is assumed to contain telephone directory entries, as discussed above, in text form. The spoken vocabulary translation table 9 is a store containing word pairs consisting of a directory representation and a spoken vocabulary representation, e.g., for the Ipswich example,

| Database representation | Spoken representation |
| --- | --- |
| IPSWICH | IPSWICH |
| IPSWICH | KESGRAVE |
| IPSWICH | FOXHALL |
| KESGRAVE | KESGRAVE |
| KESGRAVE | IPSWICH |
| FOXHALL | FOXHALL |
| FOXHALL | IPSWICH |

(If desired any word used as a database representation which has a 1:1 correspondence with, and is the same as, a spoken vocabulary word may be omitted from the table, since no translation is required). The spoken translation table 9 has a separate area for each type of field and may be accessed by the processor 5 to determine the database representation(s) corresponding to a given vocabulary word and vice versa. If desired (or if the database representations are not in text form) all items may be translated.

The pronunciation table 10 is a store containing a look-up table (and, if desired, a set of rules to reduce the number of entries in the look-up table) so that the processor 5 may access it (for synthesis purposes or for identifying homophones) to obtain, for a given spoken vocabulary word, a phonetic representation of one or more ways of pronouncing it, and, conversely (for recognition purposes), to obtain, for a given phonetic representation, one or more spoken vocabulary words which correspond to that pronunciation. A separate area for each type of field may be desirable.

Figure 3A:
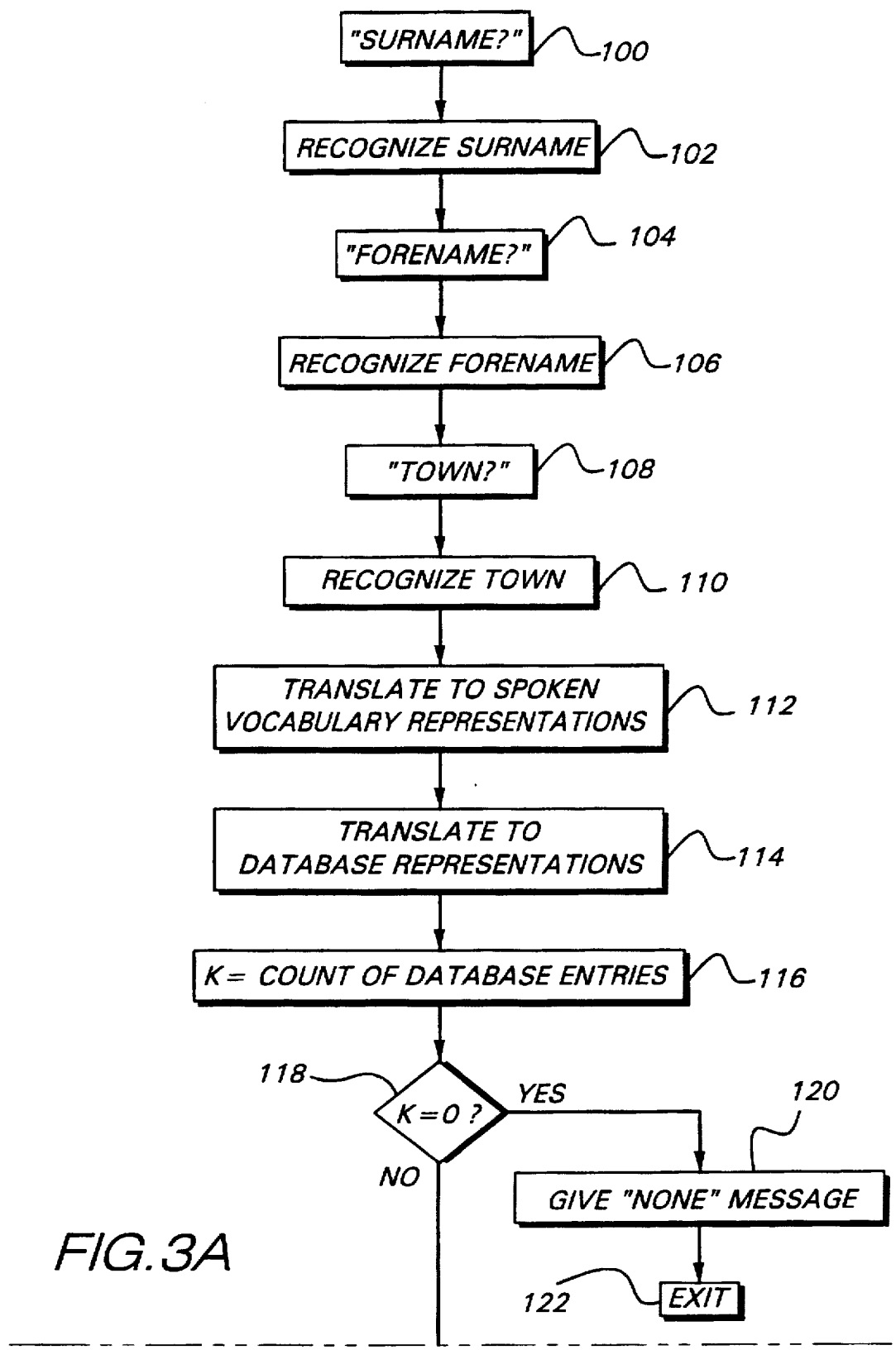
FIGS. 3a–3c are a flow chart of an exemplary control program for this invention.
Figure 3B:
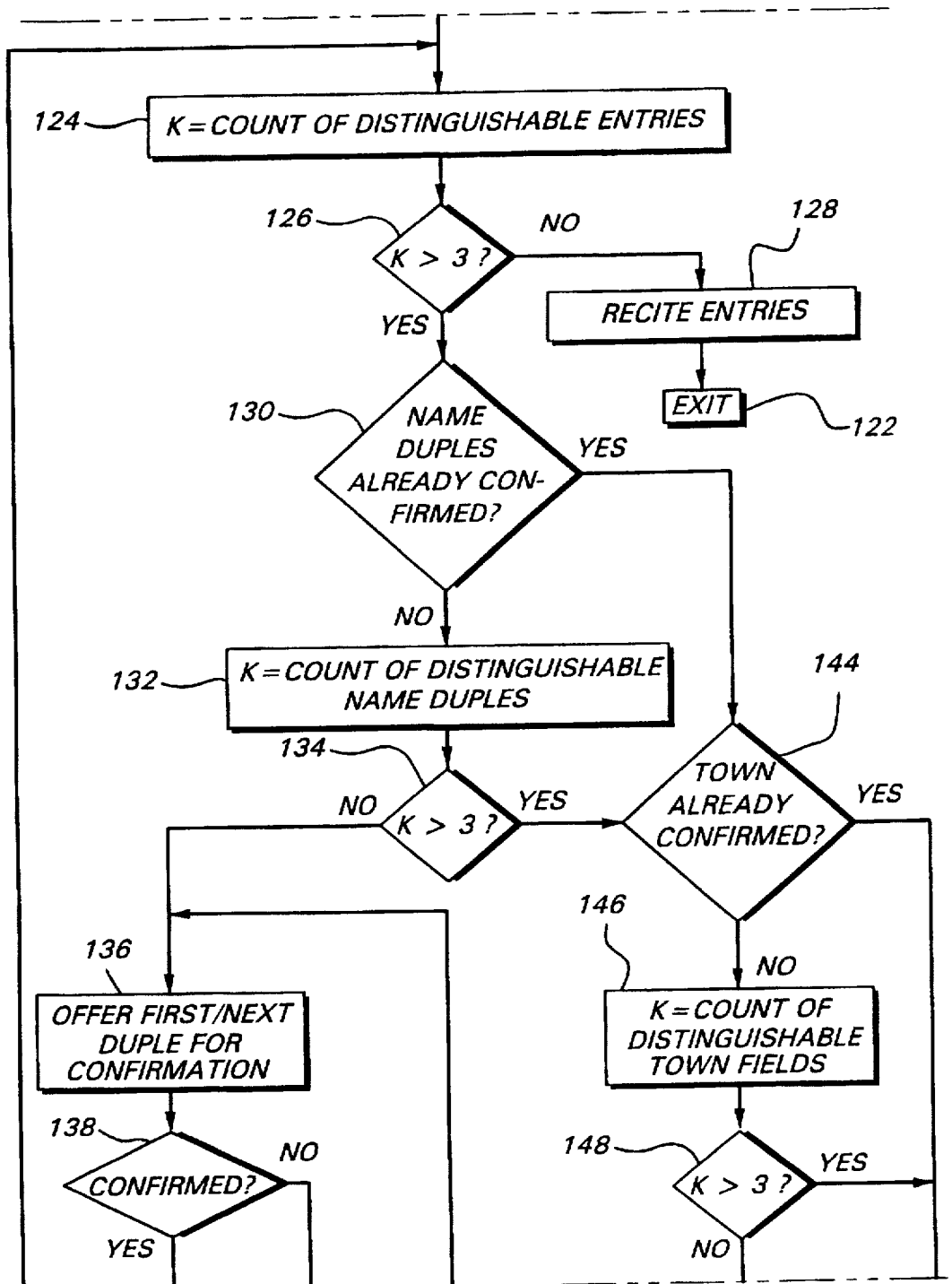
Figure 3C:
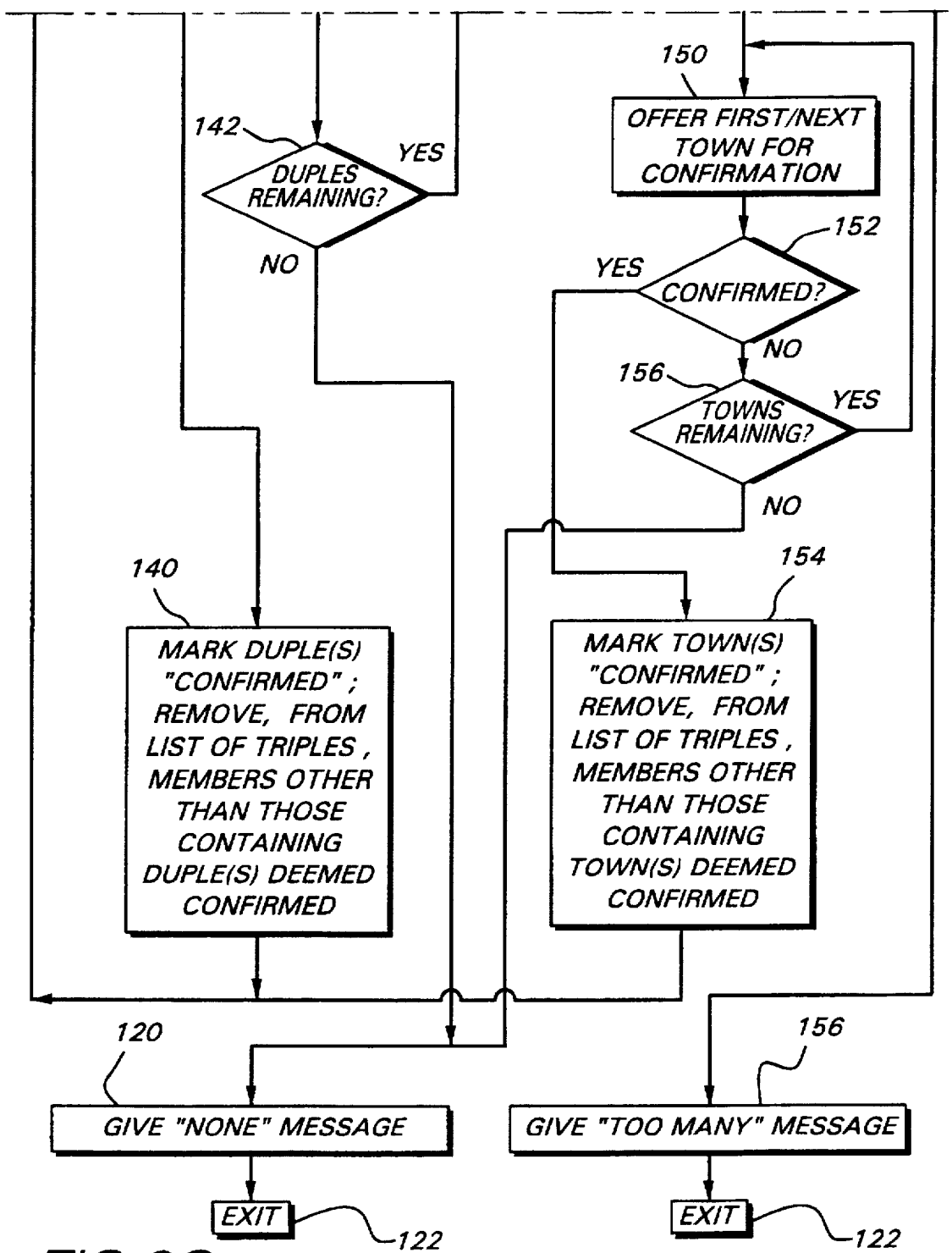

The operation of the apparatus is illustrated in the flowchart of FIGS. 3a–3c which is implemented as a program stored in the memory 6. The first steps involve the generation, using the synthesiser, of questions to the user, and recognition of the user's responses. Thus in steps 100, 104, 108 the processor 5 sends to the synthesiser 4 commands instructing it to play announcements requesting the user to speak, respectively the surname, forename and town of the person whose telephone number he seeks. In steps 102, 106 and 110 the processor sends to the recogniser 5 commands instructing it to recognise the user's responses by reference to phonetic vocabularies corresponding to those fields. The recogniser may access the translation table 9, 10 to determine the vocabularies to be used for each recognition step, or may internally store or generate its own vocabularies; in the latter case the vocabularies used must correspond to those determined by the tables 9, 10 (and, if appropriate, the database) so that it can output only words included in the phonetic vocabulary. The recogniser is arranged so that it will produce as output, for each recognition step, as many phonetic representations as meet a predetermined criterion of similarity to the word actually spoken by the user. (The recogniser could of course perform a translation to spoken vocabulary representations, and many recognisers are capable of doing so). Preferably the recogniser also produces a "score" or confidence measure for each representation indicating the relative probability of correspondence to the word actually spoken. The preliminary steps 100-110 will not be discussed further as they are described elsewhere; for example reference may be made to our co-pending International patent application no.PCT/GB/02524.

Following step 110, the processor 5 has available to it for each of the three fields, one or more phonetic representations deemed to have been recognised. What is required now is a translation to spoken vocabulary representations—i.e. the translation illustrated to the left of FIG. 1. Thus in step 112 the processor accesses the table 9 to determine, for each word, one or more corresponding spoken vocabulary representations, so that it now has three sets of spoken vocabulary representations.

The score for each spoken vocabulary representation is the score for the phonetic representation from which it was translated. If two phonetic representations translate to the same vocabulary representation, the more confident of the two scores may be taken.

In step 114, the processor 5 now performs a translation to database representations—i.e. the translation illustrated in the centre of FIG. 1—using the table 10 to determine, for each word, one or more corresponding database representations, so that it now has three sets of database representations. Scores may be propagated as for the earlier translation. These represent a number of triples (the actual number being the product of the number of representations in each of the three sets). The score for a triple is typically the product of the scores of the individual representations of which it is composed. At step 116, the processor generates a list of these triples and passes it to the database which returns a count of the number of database entries corresponding to these triples. If (step 118) this number is zero, then the processor in step 120 sends a command to the synthesiser to play an announcement to the effect that no entry has been found, and terminates the program (step 122). Alternatively other action may me taken such as transferring the user to a manual operator.

If there are entries, then in step 124 the full tuples are retrieved from the database in turn to determine whether there are three or fewer distinguishable entries. The meaning of "distinguishable" and the method of its determination will be explained presently. Once a count of four is reached the test is terminated. If (step 126) the number of distinguishable entries is three of fewer then in step 128 the processor retrieves these entries from the database and forwards them to the synthesiser 4 which reads them to the user, using the tables 9, 10 for translation from database representation to phonetic representation.

If there are more than three distinguishable entries then the process enters a confirmation phase in which an attempt is made to identify lists of extracted tuples which contain three or fewer distinguishable tuples, and to offer the tuples in turn to the user for confirmation. In this example the tuples are the duple corresponding to the name (i.e. forename+surname), and the single corresponding to the town. Note that, although the case in this example, it is not in principle necessary that the constituent words of these tuples correspond to fields for which the user has already been asked.

Firstly, therefore, a list of extracted duples is prepared from the list of triples. (If desired the number of nonidentical duples in the list may be counted, and if this exceeds a predetermined limit, e.g. 3 the detailed examination process skipped (to step 144)).

This process is iterative; thus in step 130 a check is made as to whether the name duple has already been offered for confirmation; on the first pass the answer will always be "no", and so at step 132 the name duples from the list are examined in similar fashion to that in step 124 to determine whether there are three or fewer distinguishable duples. If no, (step 134) then the duples are translated into a single phonetic representation and fed to the synthesiser in step 136 so that the synthesiser speaks the question (e.g.) "is the name John Smith?—please answer yes or no" one at a time with the recogniser forwarding the reply to the processor for (138) testing for "yes" or "no". If the user replies "yes", then, in step 140:

(a) the surname and forename fields are marked "confirmed" so that further offering of them for confirmation is bypassed by the test at step 130;

(b) all members of the list of triples, other than those which are related to the confirmed duple (see below), are deleted.

The process may then recommence from step 124.

If (step 142) the user has answered no to all the offered tuples, this is considered a failure and the process it terminated via steps 120 and 122.

If in the test at step 134 the number of distinguishable name duples is too large for confirmation, or at step 130 on a second or subsequent pass the name confirmation has already occurred, and assuming (step 144) the town name has not yet been offered for confirmation, then a town name confirmation process is commenced, comprising steps 146 to 154 which are in all respects analogous to the steps 132 to 142 already described.

If these processes fail to reduce the number of distinguishable entries at the test 126 then the process eventually terminates with an announcement 156 that too many entries have been found for a response to be given. Alternatively, a further procedure may follow in which one or more further questions are asked (as in step 100) to obtain information on further fields.

This process shown in FIG. 3b from step 116 onwards has, for clarity, been described in terms of confirmation of a duple and a single. A more generalised algorithm might proceed as follows.

Start: If there are no database entries still active:
  Give "none" message.
  Finish algorithm.
Jump: If there are three or less distinguishable database entries:
  Offer them.
  Finish algorithm.
If not, then:
  Do the following for successive prioritised fields or combinations of fields that have not already been confirmed until no such fields remain:
    If for this there is a tuple list with 3 or less distinguishable tuples then:
      Attempt to confirm on this list.
      If positive confirmation, confirm it and go to JUMP.
      If negative confirmation give "wrong entry" message.
      Go back to do the following:
  In a prioritised list, get the next vocabulary which may be asked.
If there is an un-asked and un-confirmed vocab remaining:
  Ask for it.
  Goto start of algorithm.

If not:

Give "too many" message.

Finish algorithm

In the above procedures, it is required to examine a list of tuples in database representation to determine how many distinguishable tuples there are.

The tuple in question may be an entire database entry (as in step 124 above), it may be an extracted tuple containing representations from two (or more) fields (as in step 132) or it may be an extracted single (as in step 146).

Two representations are considered indistinguishable if:

(a) they are identical; or (b) they translate to identical spoken vocabulary words (e.g. they are synonyms or are geographically confused); or (c) they translate to spoken vocabulary words which are homophones (i.e. those words translate to identical phonetic representations).

Two tuples are considered indistinguishable if every field of one tuple is indistinguishable (as defined above) from the corresponding field of the other tuple.

Suppose that we have a list of tuples in database representation where the first tuple in the list is D(1) and the tuple currently occupying the n'th position in the list is D(n) where n=1, . . . , N, there being N tuples in the list. Each tuple consists of M fields, designated d, so that the m'th field of tuple D(n) is d(n,m)—i.e. D(n)={d(n,m)}, m=1, . . . , M. Preferably the list is ordered by score; i.e. the tuple having the highest confidence is D(1), the next D(2) and so on.

Figure 4A:
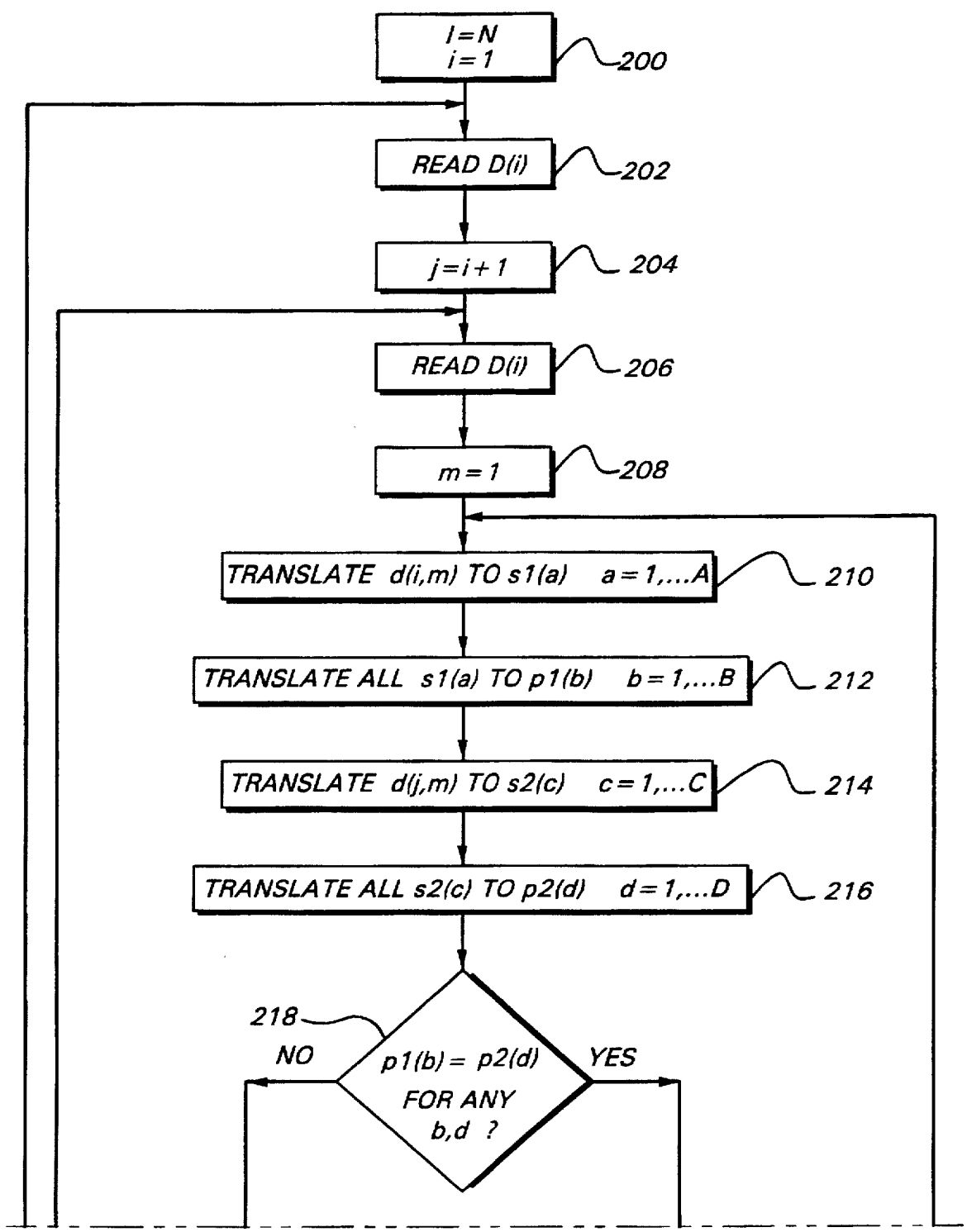
FIG. 4 is a more detailed flowchart of an exemplary process for determining a count of distinguishable database entries.
Figure 4B:
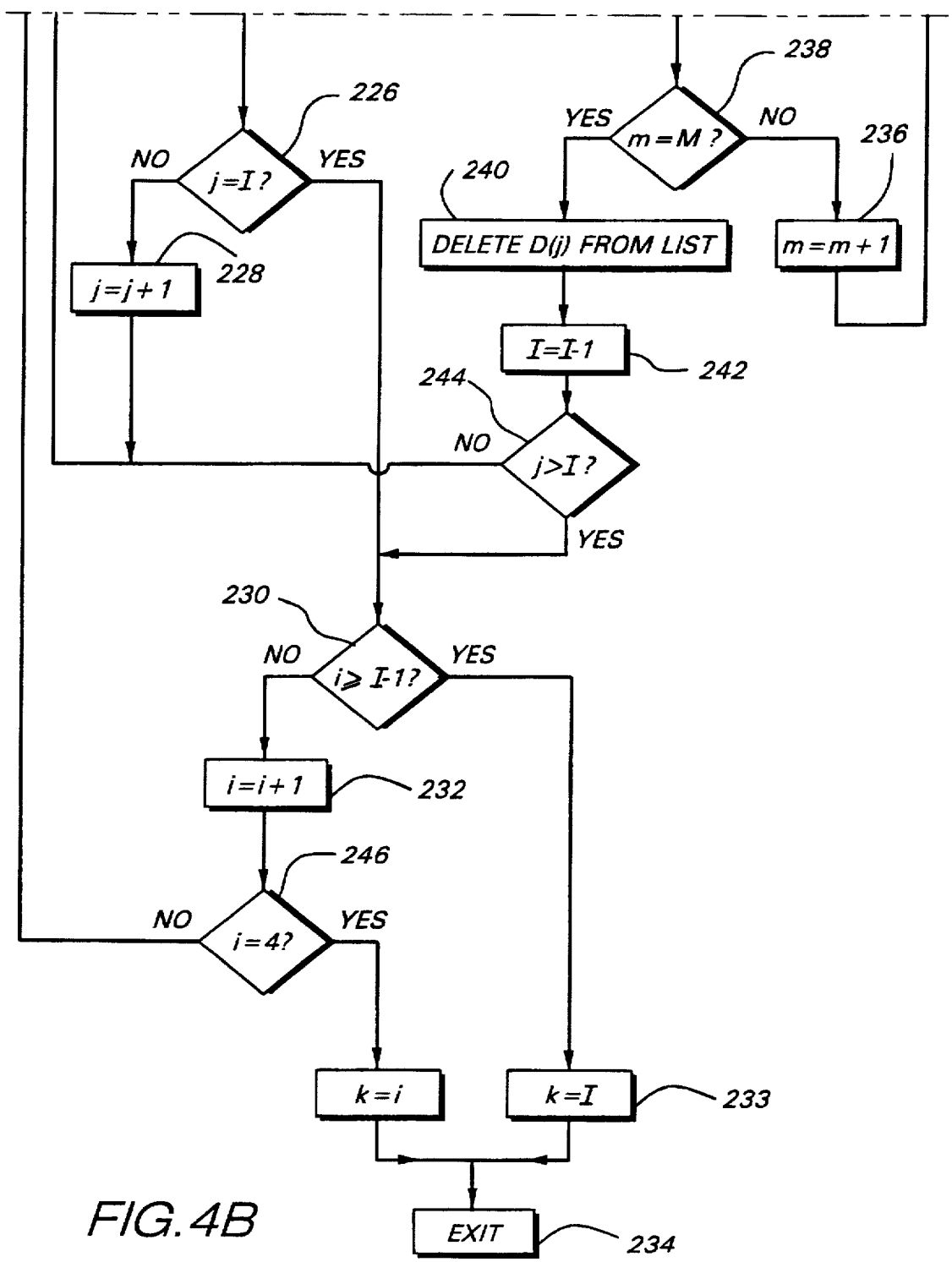

The process to be describe is illustrated in the flowchart of FIG. 4 and involves taking the first tuple from the list, and comparing it with the tuple below it in the list to ascertain whether the two are distinguishable. If they are not, the tuple occupying the lower position it is deleted from the list. This is repeated until all tuples have been examined. The same steps are then performed for the tuple now occupying the second position in the list, and so on; eventually every tuple remaining in the list is distinguishable from every other. If desired, the process may be terminated as soon as it is certain that the number of distinguishable tuples exceed that which can be handled by subsequent steps (i.e., in this example, 3).

In FIG. 4, i points to a tuple in the list and j points to a tuple lower down the list. I is the number of tuples in the list. In step 200, i is initialised to 1, I set to N, and in step 202 D(i) is read from the database. Step 204 sets j to point to the following tuple and in step 206 D(j) is read. A field pointer m is then initialised to 1 in step 208 and this is followed by a loop in which each field of the two tuples is taken in turn. Field m of tuple D(i) is (step 210) translated, with the aid of the table 9, into one or more spoken vocabulary words s1(a) where s1=1, . . . A and A is, effectively the number of synonyms found. The spoken vocabulary word(s) s1(a) is/are then translated (212) with the aid of the table 10 into a total of B phonetic representations p1(b) (b=1, . . . B). B is the number of such representations, i.e. A multiplied by the number of homophones. Analogous steps 214, 216 perform a two-stage translation of the corresponding field of D(j) to produce one or more phonetic representations s2(d) (d=1, . . . D).

In step 218, each of the phonetic representations p1(b) is compared with each of the representations p2(d) (i.e. BD comparisons in total). If equality is found in none of these comparisons, then the two tuples are considered distinguishable. If (step 226) j has not reached the last tuple in the list, it is incremented (228) prior to reading a further tuple in a repeat of step 206; otherwise the tuple pointer i is tested at step 230 as to whether it has reached the penultimate member of the list and either (if it has not) is incremented (232) prior to a return to step 202, or (if it has) the process ends. At this point, the list now contains only mutually distinguishable tuples—I in number—and thus the result k is set to I in step 233 prior to exit from this part of the process at step 234.

If on the other hand the comparison at 218 indicates identity between one of the phonetic representations generated for one field of one tuple and one of the phonetic representations generated for the same field of the other tuple then it is necessary to increment m (step 236) and repeat steps 210 to 218 for a further field. If all fields of the two tuples have been compared and all are indistinguishable then this is recognised at step 238 and the tuples are deemed to be indistinguishable. In this case, the lower tuple D(j) is removed from the list and I is decremented so that it continues to represent the number of tuples remaining in the list (steps 240, 242). j is then tested at step 244 to determine whether it points beyond the end of the (now shortened) list and if not a further tuple is examined, continuing from step 206. Otherwise the process proceeds to step 230, already described.

Each time step 232 increments i to point to a tuple, it is known that there are at least i tuples which will not be removed from the list by step 240. Thus at this point i can be tested (step 246) to see if it has reached 3, and if so the process may be interrupted, k set to 4, and thence to the exit 234.

In order to clarify the relationship between the algorithm of FIG. 4 and the steps of FIG. 3, it should be mentioned that (a) the algorithm represents the execution of step 124, with the list at the conclusion of FIG. 4 being used to access (from the database) the entries to be offered in step 128;

(b) the algorithm represents the execution of step 132, with the list at the conclusion of FIG. 4 representing the list of name duples (in database representation) to be offered to the user in step 136;

(c) the algorithm represents the execution of step 146, with list at the conclusion of FIG. 4 representing the list of towns to be offered to the user in step 150.

It remains to explain the removal which occurs in steps 140 and 154 in FIG. 3b. Taking step 140 as an example, the principle followed is that where the user has confirmed a tuple (in this case a duple) which is one of a pair (or group) of tuples deemed indistinguishable, then this is considered to constitute confirmation also of the other tuple(s) of the pair or group. For example, if the list of name duples contains:

Dave Smith

David Smyth and these are considered by step 132 to be indistinguishable and thus only the first entry ("Dave Smith") is offered to the user for confirmation in step 136. However, if the user says "yes", then in step 140, all tuples containing "Dave Smith" and all tuples containing "David Smyth" are retained.

Whilst this could be done using the results of the translations performed in step 132, we prefer to proceed as follows. Each field p of the confirmed duple in phonetic representation (i.e. the one generated in step 136) is translated using the tables 9, 10 into one or more database representations. All duples represented by combinations of these representations are to be confirmed—i.e. any of the list of triples which contains one of these duples is retained, and the other triples are deleted.

It is perhaps worth clarifying the relationship between the Entity Relationship Diagram of FIG. 1 and the processes set out in FIGS. 3a–3c and 4. In these processes, translations occur from database representation to spoken vocabulary representation to phonetic representation (i.e. right to left in FIG. 1) and in the opposite direction, viz. from phonetic representation to spoken vocabulary representation to database representation (i.e. left to right in FIG. 1). The existence of alternative paths in the diagram (e.g. may be spoken; is primarily spoken) implies a choice of translation routes. For synthesis, the "primarily spoken" routes would normally be used; for other purposes, variations are possible according to one is desire to include or exclude synonyms or homophones in the translation. From different routes some results are tabulated below, with an example set of routes for forenames.

| Direction | Used in steps | Description | Typical Route for forenames |
|---|---|---|---|
| phonetic to database | 112, 114 | Mappings used to convert a recognition result into database representation | MayBeSpoken/ MayBePronounced (i.e. include synonyms and homophones) |
| database to phonetic | 124, 132, 146 | mappings used to decide on distinguishable database representations | IsPrimarilySpoken/ MayBePronounced (i.e. exclude synonyms but include homophones in the translation -resulting in synonyms but not homophones being included in the resulting list of distinguishable tuples) |
| database to phonetic | 136, 150 | mappings used for synthesis | IsPrimarilySpoken/ IsPrimarilyPronounced |
| phonetic to database | 140,154 | mappings used to confirm a pronunciation back into database representation | MayBeSpoken/ MayBePronounced (i.e. include both synonyms and homophones |

Note that in practice the stores 9, 10 may contain separate "tables" for each mapping.

If spellings are to be used during confirmation rather than pronunciation then all the routes mentioned above substitute for 'Pronounced' 'Spelt' and the algorithms all still apply.

It should also be mentioned that spoken input is not essential—since the considerations concerning the offering and confirming still arise. For example, keypad input could be used. In this case a third vocabulary—of keypad input codes, is required.

What is claimed is:

1. A database access apparatus comprising:
   (a) a database containing entries each comprising a plurality of fields which contain machine representations of items of information pertaining to the entry, the said representations forming a first vocabulary;
   (b) announcement means responsive to machine representations falling within a second vocabulary of such representations to generate audio signals representing spoken announcements;
   (c) input means operable to receive signals and to produce machine representations falling within a third vocabulary of such representations;
   (d) translation means defining a relationship between the first vocabulary and the second vocabulary and between the first vocabulary and the third vocabulary; and
   (e) control means operable
      (i) to generate, in accordance with the defined relationship, for each representation produced by the input means, one or more representations according to the first vocabulary;
      (ii) to identify database entries containing the generated representations;
      (iii) to examine each representation or combination of representations which is contained in a selected field or combination of fields of the identified entries to identify unique one(s) of those representations or combinations, a unique representation or combination being one which, when translated using the translation means into representations of the second vocabulary, differs from every other such unique representation or combination when similarly translated; and
      (iv) to control the announcement means to generate an announcement including at least one word or combination of words which correspond(s) to one of the unique representations or combinations.

2. An apparatus according to claim 1 in which the control means is operable, in step (iv), for the or each unique representation or combination, to generate, using the translation means, from the unique representation or combination, one representation or combination in the second vocabulary and to transmit this to the announcement means.

3. An apparatus according to claim 1 in which the control means is operable, in step (iv), for the or each unique representation or combination, to transmit to the announcement means one representation or combination in the second vocabulary which corresponds, in accordance with a relationship defined by the translation means, to the unique representation or combination and which has already been generated in step (iii).

4. An apparatus according to claim 1, in which the control means is operable in step (iv) to generate an announcement requesting confirmation of the included word or combination and is further arranged, in operation:
   (v) upon receipt of a confirmatory response, to generate from a representation or combination in the second vocabulary, which corresponds to the included word(s) one or more representations of combinations according to the first vocabulary and to identify which of the database entries identified in step (ii) which contains such a representation or combination in the selected field(s).

5. An apparatus according to claim 1 in which the input means is a speech recogniser.

6. An apparatus according to claim 5 in which the second and third vocabularies are identical.

7. A database access apparatus comprising:
   (a) a database containing entries each comprising a plurality of fields which contain machine representations of items of information pertaining to the entry, the said representations forming a first vocabulary;
   (b) announcement means responsive to machine representations falling within a second vocabulary of such representations to generate audio signals representing spoken announcements;
   (c) speech recognition means operable to receive audio signals and to produce machine representations thereof falling within the second vocabulary;
   (d) translation means defining a relationship between the first vocabulary and the second vocabulary; and
   (e) control means operable
      (i) to generate, in accordance with the defined relationship, for each representation produced by the recogniser, one or more representations according to the first vocabulary;

(ii) to identify database entries containing the generated representations;

(iii) to examine each representation or combination of representations which is contained in a selected field or combination of fields of the identified entries to identify unique one(s) of those representations or combinations, a unique representation or combination being one which, when translated in accordance with the defined relationship into representations of the second vocabulary, differs from every other such unique representation or combination when similarly translated; and (iv) to control the announcement means to generate an announcement including at least one word or combination of words which correspond(s) to one of the unique representations or combinations.

8. An apparatus according to claim 7 in which at least one of the selected field(s) is a field in which, in step (ii), a generated representation was found, and in which a word included at step (iv) is a word which corresponds to a representation generated by the recogniser.

9. A method of speech recognition comprising:

(a) generating at least one announcement requiring a spoken response;

(b) recognising the response(s);

(c) identifying database entries containing fields matching the recognised responses;

(d) in the event that the number of such entries exceeds a predetermined limit, generating an announcement containing at least one word corresponding to a selected field of an identified entry for a positive or negative response;

(e) upon receipt of a positive response, identifying database entries which contain fields matching the recognised responses and whose selected fields match the said word; and (f) repeating steps (d) and (e) at least once.

10. A method of speech recognition comprising:

(a) generating at least one announcement requiring a spoken response;

(b) recognising the response(s);

(c) identifying database entries containing fields matching the recognised responses;

(d) in the event that the number of such entries does not exceed, or equals, a predetermined limit, generate an announcement presenting one or more of the records each containing one or more of the field(s) of the matching entries, and exit;

(e) in the event that the number of such entries exceeds a predetermined limit, for a particular field or selection of fields, examine a unique representation or selection of representations, which is contained in the particular field or combination of fields of the identical entries, a unique representation or combination of representations being established according to a know criterion;

(f) in the event that the number of such unique representation or combination of representations is above a predetermined limit, repeat (e), selecting another field or selection of fields, according to a pre-determined order, that has not already been considered until no such fields remain to be considered; and (g) generating at least one announcement requiring a spoken response that has not already been requested;

(h) recognising the response(s);

(i) repeat (c) at least once;

(j) in the event that the number of such unique representation or combination of representations is below or equal to a predetermined limit, generate an announcement containing at least one word corresponding to the selected field(s) of an identified entry for a positive or negative response;

(k) upon receipt of a positive response, identifying database entries which contain fields matching the recognised responses and whose selected fields match the said words or combination of words; and (l) repeat steps (d) and (e) at least once;

(m) upon receipt of a negative response for all such word or words, exit.

* * * * *